Patented May 3, 1949

2,468,868

UNITED STATES PATENT OFFICE 2,468,868

GLASS OF VERY RAPID FUSION AND HIGH POINT OF TRANSFORMATION

André Danzin and Edouard Despois, Paris, France, assignors to Societe Francaise Radio-Electrique, a corporation of France No Drawing. Application May 13, 1947, Serial No. 747,836. In France December 27, 1945

Section 1, Public Law 690, August 8, 1946
Patent expires December 27, 1965

2 Claims. (Cl. 106—53)

This invention relates to the manufacture of glass and has for its object to provide glasses of very rapid fusion and high point of transformation.

More specifically the invention, seeks to provide improved glasses well adapted for working into pressed glass parts in particular, by machines fed with glass in the liquid state. The properties mainly required in such a glass are: (1) a low co-efficient of expansion; (2) a very low temperature of fusion; (3) a relatively high temperature of softening (Littleton point in the neighbourhood of 680°), and (4) good fluidity at temperature only a little above the softening temperature.

According to this invention a glass having the above properties is made with a composition falling within the following table:

|  | Percent |
|---|---|
| $SiO_2$ | 34 to 38 |
| PbO | 24 to 30 |
| $B_2O_3$ | 20 to 26 |
| $Al_2O_3$ | 3.5 to 5.5 |
| ZnO | 8 to 9 |
| Other matter | 0 to 1 |

With such glasses good fluidity can be obtained at relatively low temperature this permitting the manufacture of non-deformable glass parts at about 500 to 550°.

A preferred glass having the following composition possesses a co-efficient of expansion which accords well with that of molybdenum:

|  | Percent |
|---|---|
| $SiO_2$ | 36 |
| PbO | 25 |
| $B_2O_3$ | 25 |
| $Al_2O_3$ | 5 |
| ZnO | 8.6 |
| $As_2O_3$ | 0.4 |

What we claim is:

1. A glass of low expansion, low temperature of fusion, relatively high temperature of softening and high fluidity at temperatures a little above that of softening having a composition within the following table:

|  | Percent |
|---|---|
| $SiO_2$ | 34 to 38 |
| PbO | 24 to 30 |
| $B_2O_3$ | 20 to 26 |
| $Al_2O_3$ | 3.5 to 5.5 |
| ZnO | 8 to 9 |

2. A glass as claimed in claim 1 having an expansion suited to that of molybdenum having the following composition:

|  | Percent |
|---|---|
| $SiO_2$ | 36 |
| PbO | 25 |
| $B_2O_3$ | 25 |
| $Al_2O_3$ | 5 |
| ZnO | 8.6 |
| $As_2O_3$ | 0.4 |

ANDRÉ DANZIN.
EDOUARD DESPOIS.

REFERENCES CITED

The following references are of record in the file of this patent:

UNITED STATES PATENTS

| Number | Name | Date |
|---|---|---|
| 2,431,983 | Bastick et al. | Dec. 2, 1947 |